(12) United States Patent
Bennett

(10) Patent No.: US 7,776,809 B2
(45) Date of Patent: Aug. 17, 2010

(54) COMPOSITION AND METHOD FOR TREATMENT OF RESIDUES IN PUMPING, BORE AND RETICULATION EQUIPMENT

(76) Inventor: David Bennett, 14 Goongarrie St., Bayswater (AU) 6053

( * ) Notice: Subject to any disclaimer, the term of this patent is extended or adjusted under 35 U.S.C. 154(b) by 80 days.

(21) Appl. No.: 11/813,414

(22) PCT Filed: Jan. 4, 2006

(86) PCT No.: PCT/AU2006/000005

§ 371 (c)(1),
(2), (4) Date: Mar. 19, 2008

(87) PCT Pub. No.: WO2006/072134

PCT Pub. Date: Jul. 13, 2006

(65) Prior Publication Data

US 2009/0082238 A1    Mar. 26, 2009

(30) Foreign Application Priority Data

Jan. 6, 2005    (AU) .............................. 2005900040

(51) Int. Cl.
*C11D 7/08* (2006.01)
*C11D 7/10* (2006.01)

(52) U.S. Cl. ........................ 510/188; 510/253; 510/269; 510/270; 510/508

(58) Field of Classification Search ................. 510/188, 510/253, 269, 270, 508
See application file for complete search history.

(56) References Cited

U.S. PATENT DOCUMENTS

| | | | | |
|---|---|---|---|---|
| 4,512,921 A | * | 4/1985 | Anstine et al. | ............... 376/310 |
| 4,595,591 A | * | 6/1986 | Mardi et al. | ................ 424/718 |
| 5,542,981 A | | 8/1996 | Lee, Sr. | |
| 5,746,813 A | * | 5/1998 | Ishido et al. | ............. 106/14.16 |
| 6,267,979 B1 | | 7/2001 | Raad et al. | |
| 6,869,912 B2 | * | 3/2005 | Brigatti | ...................... 504/152 |
| 2008/0035583 A1 | * | 2/2008 | Lopez Martinez et al. | .. 210/759 |

FOREIGN PATENT DOCUMENTS

WO    WO 02096202    12/2002

* cited by examiner

*Primary Examiner*—Charles I Boyer
(74) *Attorney, Agent, or Firm*—Hogan Lovells US LLP

(57) ABSTRACT

A method and a composition for remediating reticulation equipment such as a bore having biocontamination deposits is disclosed. In its most preferred form, the composition is formed by mixing dry solid oxalic acid, a cupric salt such as copper sulphate, and a solid acidic compound such as sodium bisulphate. Proportions of 94%, 2% and 4% respectively are suitable, while avoiding toxicity and contamination problems. After thorough mixing this mixture can be stored in a dry sealed container for future use. In use, the reticulation equipment is dosed with from 3 kg to 7 kg of mixture per hundred litres of water contained within the reticulation equipment.

23 Claims, No Drawings

COMPOSITION AND METHOD FOR TREATMENT OF RESIDUES IN PUMPING, BORE AND RETICULATION EQUIPMENT

RELATED APPLICATION

The present application claims priority of Australian Patent Application No. AU20059000040 filed 6 Jan. 2005, and International Patent Application No. PCT/AU2006/000005 filed 4 Jan. 2006, both of the disclosures of which are incorporated herein in their entireties by this reference.

FIELD OF THE INVENTION

This invention relates to a composition and method for treating and removing residues that build up on equipment in bores used for pumping underground reserves of groundwater.

BACKGROUND OF THE INVENTION

Arid regions or regions that experience dry seasons are often reliant on ground water reserves for non-potable water for use in horticulture and for watering parks and gardens. It is a common problem in some regions with such ground water, that it contains dissolved iron, usually dissolved in ferrous (Fe2+) form. This will oxidise to ferric form on exposure to air, leading to staining of surfaces on which the bore water contacts. A more serious problem, and one which this invention seeks to address, is where iron is oxidised to ferric form by microbial action. The iron is incorporated in a slime which is deposited on internal parts of reticulation systems such as pumps, valves, and pipes etc. Not only can bacteria utilise dissolved iron, but can also oxidise iron contained in internal parts of reticulation systems, leading to early equipment failure. The presence of these deposits also leads to reduced performance, blockages, and failure of valves and sprinklers.

Various solutions have been proposed to iron build-up in reticulation systems. For example, hydrochloric acid has been used, but problems are experienced including severe corrosion leading to unserviceability, generation of noxious gasses, and also safety issues with handling. In addition, industrial grade hydrochloric acid can often be contaminated with impurities which can present a risk to the environment. It has been found also that hydrochloric acid is not particularly effective against biofouling deposits.

Phosphoric acid has also been used, but has been found to have similar disadvantages to hydrochloric acid, and in addition, has the disadvantage of adding phosphorus to the environment. Phosphorus in the environment is a known contributor to algal blooms.

It is an object of the present invention to provide a composition and method for treating underwater equipment to remove or minimise build-up of such deposits.

The preceding discussion of the background to the invention is intended to facilitate an understanding of the present invention. However, it should be appreciated that the discussion is not an acknowledgement or admission that any of the material referred to was part of the common general knowledge in Australia or elsewhere as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

SUMMARY OF THE INVENTION

In accordance with the invention there is provided a method of treating reticulation equipment in-situ to remove or remediate contamination deposits, said method comprising dosing said equipment with a composition in an amount of from 1.5% as solid, by weight of water within said equipment, said composition being formed of oxalic acid, and at least 0.1% by weight $Cu^{2+}$ cations (expressed by weight of oxalic acid) provided to form a copper oxalate in water in said equipment, and an acid compound in sufficient quantity to maintain pH of less than 4 in water in said equipment.

Preferably said equipment is dosed with said composition in an amount of from 2% to 10% as solid, by weight of water within said equipment. While a higher percentage weight of composition will work effectively, use of a higher percentage weight of composition is unwarranted and presents disposal issues.

Preferably said equipment is dosed with said composition in an amount of from 3% to 7% as solid, by weight of water within said equipment.

Preferably said equipment is dosed with said composition in an amount of from 4% to 5% as solid, by weight of water within said equipment.

Preferably said equipment is dosed with said composition in an amount of about 4.16% as solid, by weight of water within said equipment.

Also in accordance with the invention there is provided a composition for in-situ remediation of contamination deposits in reticulation equipment, said composition comprising oxalic acid, at least 0.1% by weight of $Cu^{2+}$ cations provided to form a copper oxalate in water in said equipment, and an acid compound in sufficient quantity to maintain a pH of less than 4 in water in said equipment.

Preferably said acid compound is added in sufficient quantity to maintain pH of less than 3 in water in said equipment.

Preferably said acid compound is added in sufficient quantity to maintain pH of less than 2.5 in water in said equipment.

Preferably said acid compound is added insufficient quantity to maintain pH of from 2.2 to 2.5 in water in said equipment.

Preferably said acid compound is non-reactive toward said oxalic acid and said copper oxalate.

Preferably said acid compound is provided as a solid.

Preferably said acid compound is provided as a bisulphate salt.

Preferably said acid compound is provided as sodium bisulphate.

Preferably said sodium bisulphate forms at least 2% of the weight of the composition.

Preferably said sodium bisulphate forms no more than 10% of the weight of the composition.

Preferably said sodium bisulphate forms no more than 8% of the weight of the composition.

Preferably said sodium bisulphate forms no more than 6% of the weight of the composition.

Preferably said sodium bisulphate forms from 3% to 5% of the weight of the composition.

Preferably said $Cu^{2+}$ cations are provided in proportion to the weight of oxalic acid in said composition in an amount of from 0.2% to 2% by weight.

Preferably said $Cu^{2+}$ cations are provided in proportion to the weight of oxalic acid in said composition in an amount of from 0.3% to 1.5%.

Preferably said $Cu^{2+}$ cations are provided in proportion to the weight of oxalic acid in said composition in an amount of from 0.4% to 1%.

Preferably said $Cu^{2+}$ cations are provided in proportion to the weight of oxalic acid in said composition in an amount of from 0.45% to 0.75%.

Preferably said $Cu^{2+}$ cations are provided in proportion to the weight of oxalic acid in said composition in an amount of from 0.5% to 0.6%.

Preferably said composition is formed of from 94% by weight oxalic acid as dihydrate, 2% by weight cupric sulphate as penta-hydrate, and 4% by weight sodium bisulphate as monohydrate.

It should be noted that all calculations to determine proportions of constituents in the composition are based on oxalic acid as dihydrate, cupric sulphate as penta-hydrate, and sodium bisulphate as monohydrate.

DETAILED DESCRIPTION OF PREFERRED EMBODIMENTS

A preferred embodiment of the invention will now be described in the following description of a method and a composition for remediating a bore having biocontamination deposits.

The composition of the embodiment is formed by mixing dry solid oxalic acid, copper sulphate, and sodium bisulphate in proportion 94%, 2% and 4% respectively. This mixture can, after thorough mixing be stored in a dry sealed container for future use. In use, the bore is dosed with 4.16 kg of mixture per hundred litres of water within the bore casing. Higher dosing up to 7 kg of mixture per hundred litres within the bore casing can be employed, but the dosing should not exceed this due to toxicity of excessive copper, and also excessive acidity of the resultant solution. The following table provides guidance to dosage rates based on the bore casing diameter and depth of the bore:

| Pipe/Casing Diameter | Litres per Meter | Composition per meter of water |
| --- | --- | --- |
| 101 mm | 8 | .332 kg |
| 152 mm | 18 | .75 kg |
| 203 mm | 32 | 1.4 kg |
| 254 mm | 50 | 2.1 kg |
| 304 mm | 73 | 3 kg |
| 355 mm | 99 | 4.1 kg |
| 406 mm | 129 | 5.4 kg |
| 457 mm | 164 | 6.8 kg |
| 508 mm | 202 | 8.4 kg |

Prior to dosing the bore, it may be necessary to modify the headwork to provide access to the inside of the casing, so that the composition can be poured in at a position where it will descend under gravity down the bore casing. It is not necessary to remove the pump from the bore casing in order to treat the bore.

The headwork is removed from the bore, and composition is poured into the bore casing. Alternatively the composition is poured into the bore casing though an access point which is normally secured with a sealing cover. In the borehole, the composition mixes with the water contained within the casing. Some of the composition dissolves immediately in the water but most of it will fall down through the water column within the bore casing. As it falls it settles on biodeposits within the bore casing. In the case of iron reducing bacteria the biodeposits may comprise a slimy structure incorporating bacterial colonies and hydrated ferric oxide. Near the bottom of the bore casing, the composition will settle on the pump, contacting the deposits built up on it. The composition should be left for 30 minutes to settle.

The composition continues dissolving, once settled, in proximity to the bacterial colonies. On dissolution, the copper sulphate reacts with oxalic acid to form copper oxalate, which is believed to disrupt the cell membrane of bacteria. The reaction yield of sulphuric acid, combined with that introduced through the sodium bisulphate along with the oxalic acid, solubilises the ferric deposits. The sulphuric acid (from the sodium bisulphate) ensures that the pH is lower than would otherwise be the case, enhancing iron deposit removal.

The presence of sulphuric acid also ensures effectiveness in hard water. While oxalic acid has been used to treat iron reducing bacteria deposits in bores, it has been found to be ineffective in hard water.

The bore pump should be run to recycle the treatment solution comprising the composition from the pump to the bore casing for from one to four hours depending upon the degree of contamination to clean the inside of the pump and rising main, and then left to stand.

The composition is left to stand in the water column within the bore casing for up to 24 hours, and preferably from 24 hours to 48 hours, after which it is discharged, along with dislodged deposits. In badly clogged systems, the deposits will be entrained in the pumped water, in which case after treatment and before the system is placed in service, the water should be discharged through an opening at a remote location along the main, but not through valves or sprinklers which might become clogged. However where the system is known to be not badly contaminated such as when on a schedule of preventative treatment, the water can be discharged through valves and sprinklers, so that the dissolved composition may clean these items also, while being discharged.

Where the treatment solution comprising the dissolved composition is pumped for disposal, it can be neutralised using agricultural lime.

While the invention has been described in relation to treatment of bores subject to contamination by iron reducing bacteria, it has in trials been found effective in use against biofouling by bacteria that act on manganese present in groundwater and surrounds. In addition, it is believed that the invention may have application in instances of contamination caused by sulphur reducing bacteria. It is also possible that the invention may have effect against biofouling caused by bacteria and other microorganisms that derive energy from other elements and ionic species having ionic species more than one oxidation state or ionic species having multiple valencies.

It should be appreciated that changes may be made to various features in the above described embodiment without departing from the spirit and scope of the invention, and that the invention is not limited to the specific embodiment described herein.

The claims defining the invention are as follows:

1. A method of treating reticulation equipment in-situ to remove or remediate contamination deposits, said method comprising dosing said equipment with a composition in an amount of from 1.5% as solid, by weight of water within, said equipment, said composition being formed of oxalic acid, and at least 0.1% by weight $Cu^{2+}$ cations (expressed by weight of oxalic acid) provided to form a copper oxalate in water in said equipment, and an acid compound in sufficient quantity to maintain pH of less than 4 in water in said equipment.

2. A method as claimed in claim 1 wherein said equipment is dosed with said composition In an amount of from 2% to 10% as solid, by weight of water within said equipment.

3. A method as claimed in claim 1 wherein said equipment is "dosed, with said composition in an amount of from 3% to 7% as solid, by weight of water within said equipment.

4. A method as claimed in claim 1 wherein said equipment is dosed with said composition in an amount of from 4% to 5% as solid, by weight of water within said equipment.

5. A method as claimed in claim 1 wherein said equipment is dosed with said composition, in an amount of about 4.16% as solid, by weight of water within said equipment.

6. A reticulation equipment remediation or reticulation equipment contamination deposit removal composition comprising oxalic acid, at least 0.1% by weight of $Cu^{2+}$ cations provided to form a copper oxalate in water in said equipment, and an acid compound in sufficient quantity to maintain a pH of less than 4 in water in said equipment, wherein said acid compound is provided as a bisulphate salt.

7. A composition as claimed in claim 6 wherein said acid compound is added in sufficient quantity to maintain pH of less than 3 in water in said equipment.

8. A composition as claimed in claim 6 wherein said acid compound is added in sufficient quantity to maintain pH of less than 2.5 in water in said equipment.

9. A composition as claimed in claim 6 wherein said acid compound is added in sufficient quantity to maintain pH of from 2.2 to 2.5 in water in said equipment.

10. A composition as claimed in claim 6 wherein said acid compound is non-reactive toward said oxalic acid and said copper oxalate.

11. A composition as claimed in claim 6 wherein said acid compound is provided as a solid.

12. A composition as claimed in claim 6 wherein said acid compound is provided as sodium bisulphate.

13. A composition as claimed in claim 12 wherein said sodium bisulphate forms at least 2% of the weight of the composition.

14. A composition as claimed in claim 13 wherein said sodium bisulphate forms no more than 10% of the weight of the composition.

15. A composition as claimed in claim 13 wherein said sodium bisulphate forms no more than 8% of the weight of the composition.

16. A composition as claimed in claim 13 wherein said sodium bisulphate forms no more than 6% of the weight of the composition.

17. A composition as claimed in claim 12 wherein said sodium bisulphate forms from 3% to 5% of the weight of the composition.

18. A composition as claimed in claim 6 wherein said $Cu^{2+}$ cations are provided in proportion to the weight of oxalic acid in said composition in an amount of from 0.2% to 2% by weight.

19. A composition as claimed in claim 18 wherein said $Cu^{2+}$ cations are provided in proportion to the weight of oxalic acid in said composition in an amount of from 0.3% to 1.5% by weight.

20. A composition as claimed in claim 18 wherein said $Cu^{2+}$ cations are provided in proportion to the weight of oxalic acid in said composition in an amount of from 0.4% to 1% by weight.

21. A composition as claimed in claim 18 wherein said $Cu^{2+}$ cations are provided in proportion to the weight of oxalic acid in said composition in an amount of from 0.45% to 0.75% by weight.

22. A composition as claimed in claim 18 wherein said $Cu^{2+}$ cations are provided in proportion to the weight of oxalic acid in said composition in an amount of from 0.5% to 0.6% by weight.

23. A composition as claimed in claim 6 wherein said composition is formed of from 94% by weight oxalic acid as dihydrate, 2% by weight cupric sulphate as penta-hydrate, and 4% by weight sodium bisulphate as monohydrate.

* * * * *